INVENTOR
ROELOF MAARTEN MARIE OBERMAN
BY Hugh A. Kirk
AGENT

INVENTOR
ROELOF MAARTEN MARIE OBERMAN
BY Hugh A. Kirk
AGENT

INVENTOR
ROELOF MAARTEN MARIE OBERMAN
BY Hugh A. Kirk
AGENT

INVENTOR
ROELOF MAARTEN MARIE OBERMAN
BY Hugh A. Kirk
AGENT

INVENTOR
ROELOF MAARTEN MARIE OBERMAN
BY Hugh A Kirk
AGENT

INVENTOR
ROELOF MAARTEN MARIE OBERMAN
BY Hugh A. Kirk
AGENT

INVENTOR
ROELOF MAARTEN MARIE OBERMAN
BY Hugh A. Kirk
AGENT

INVENTOR
ROELOF MARIE MARIE OBERMAN
BY Hugh A. Kirk
AGENT 2,859,279

REGENERATIVE REPEATERS COMPRISING A DOUBLE MEMORY FOR SIGNALS IN A START-STOP-CODE

Roelof Maarten Marie Oberman, Voorburg, Netherlands, assignor to Staatsbedrijf der Posterijen, Telegrafie en Telefonie, The Hague, Netherlands Application February 7, 1955, Serial No. 486,441

Claims priority, application Netherlands February 11, 1954

37 Claims. (Cl. 178—70)

This invention relates to a regenerative repeater for multi-element signals in a start-top code. More particularly, it deals with a regenerative repeater which utilizes an intermediate memory device for the storage of one signal element during the interval between the scanning of two successive signal elements in the receiving circuit of such a regenerative repeater; and a similar final memory device for the storage of one signal element. At the moment of the beginning of the retransmission, this final storage device receives the contents of the intermediate memory device and stores it for the duration of said retransmission, so that when the next signal element is received in the intermediate memory device, the preceding signal element will have been already transferred to the final memory device for its retransmission.

Mechanical regenerative repeaters are known which have one or more shafts rotating under the control of electro-magnetic couplings; namely, those comprising one shaft and which have a memory device for only one signal element, and those comprising two shafts and which have memory devices corresponding to the number of intelligence elements of the signal to be regenerated. Furthermore, electronic regenerative repeaters are known which fundamentally correspond to those of the mechanical type having one shaft and a memory device for only one signal element. (See Oberman U. S. Reissue Patent No. Re. 23,801).

All known regenerative repeaters which have only one memory device have the same inherent disadvantages which will be explained more fully in the following description of the present invention. However, said disadvantages become more apparent when start-stop signals having a stop element of short duration are used (for example 20 milliseconds) and when more than one regenerative repeater is included in series in a telegraph line. Said disadvantages are absent when a regenerative repeater according to the present invention is used in a telegraph system or any other system that requires the reshaping of the signal elements.

It is an object of this invention to produce an efficient, simple, effective and economic regenerative repeater comprising a double memory device for signals in a stop-start code, which repeater will pass the C. C. I. T. recommendations for such repeaters.

Another object of this invention is to produce such a regenerative repeater in which signals are successively stored in an intermediate memory device and then are successively transferred and stored again in a final memory device.

Another object of this invention is to produce such a regenerative repeater which comprises a reception distributor and a transmission distributor and in which said distributors operate substantially independently of each other.

Another object of this invention is to produce a regenerative repeater in which time shifts in the start-stop transition, such as due to distortion delays and velocity changes, may be automatically and quickly corrected in the retransmitted signals, including correction even through a series of such repeaters.

Another object of this invention is to produce a regenerative repeater in which the shift of the start-stop transition for each subsequent signal only becomes apparent in the retransmission of the signal elements as a reduction in the duration of the stop elements of the signals.

Generally speaking, the regenerative repeater of the present invention may be utilized as a regenerative telegraph repeater for signals in a start-stop code. Said regenerative repeater may have a receiving circuit and a transmitting circuit which operate substantially independently of each other. The receiving circuit in cooperation with a first time base device determines the kind of signal elements as a function of the start-stop transitions of the subsequent signal elements and successively stores said signal elements in the same intermediate memory device, the position of said first time base device remaining the same for the duration of at least one signal element. A second time base device determines the transitions of the elements of the regenerated signals. After the signal elements are stored in the intermediate memory device, they are passed successively, while under the control of said second or said first and second time base devices, into a final memory device, and the position of said final memory device controls the regenerated signals.

In an electronic regenerative repeater according to this invention, the receiving circuit may have a polar receiving relay, or said relay may be replaced by an electronic circuit, such as a trigger circuit. This receiving circuit or receiving polar relay is connected to a start-stop circuit which controls the starting and stopping of a first oscillator or pulse generator circuit. The reception of a start-stop transition causes said first generator circuit, which produces a square wave potential, to generate a predetermined number of cycles which number of cycles are determined by and under the control of a first time base or semistable trigger circuit. During this cycle and under the control of the first generator in cooperation with said first semi-stable trigger circuit, the incoming signal elements are scanned in a first scanning circuit which may comprise rectifying relay cells. Said incoming signals then may be stored in a first bi-stable trigger circuit, which serves as an intermediate memory device. When the position of the first semi-stable trigger circuit varies for the first time, or it is started, a second start-stop circuit starts a second oscillator or pulse generator circuit which is also under the control of a second semi-stable trigger circuit. In a manner similar to that of the first generator circuit, the second generator circuit generates a predetermined number of cycles. The coincidence of operation of the first and second generator circuits may be determined in a second scanning circuit, which also may comprise rectifying cells, and said coincidence of operation is repeated after each cycle. The kind of signal stored in the intermediate memory device is passed via said second scanning circuit to a second bi-stable trigger circuit, which is connected as a memory device and which can serve as a final memory and as a transmission circuit. Connected to said final memory device may be a polar transmitting relay which can retransmit the signal elements stored in the final memory device in the form of double current signals.

A mechanical regenerative repeater may also be produced in accordance with the scope of this invention, wherein the two time base and scanning devices are incorporated into two separate rotating distributors, namely a receiving distributor and a transmitting distributor, which distributors may be driven by the same electric motor, although they are independently operated. These distributors may be thus connected to a single and the same intermediate memory device, such as a condenser or a relay, and separate electromagnetic pawl releasing means may be provided for starting and stopping the operation of each distributor each signal cycle.

The above mentioned and other features and objects of this invention and the manner of attaining them will become more apparent and the invention itself will be best understood by reference to the following description of embodiments of the invention taken in conjunction with the accompanying drawings, wherein.

Figure 5:
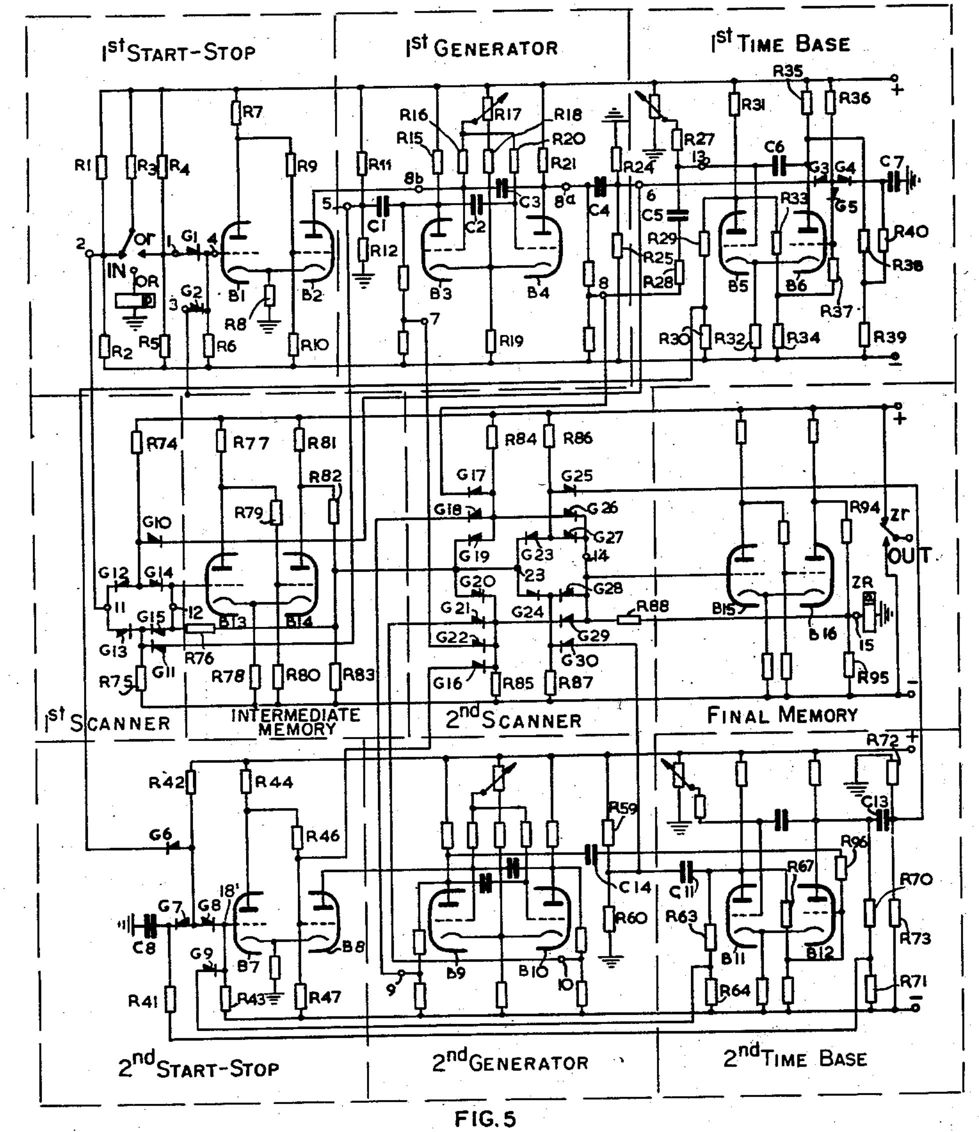
Fig. 5 shows a basic wiring diagram of an electronic regenerative repeater having a double memory device according to one embodiment of the present invention.
Figure 6:
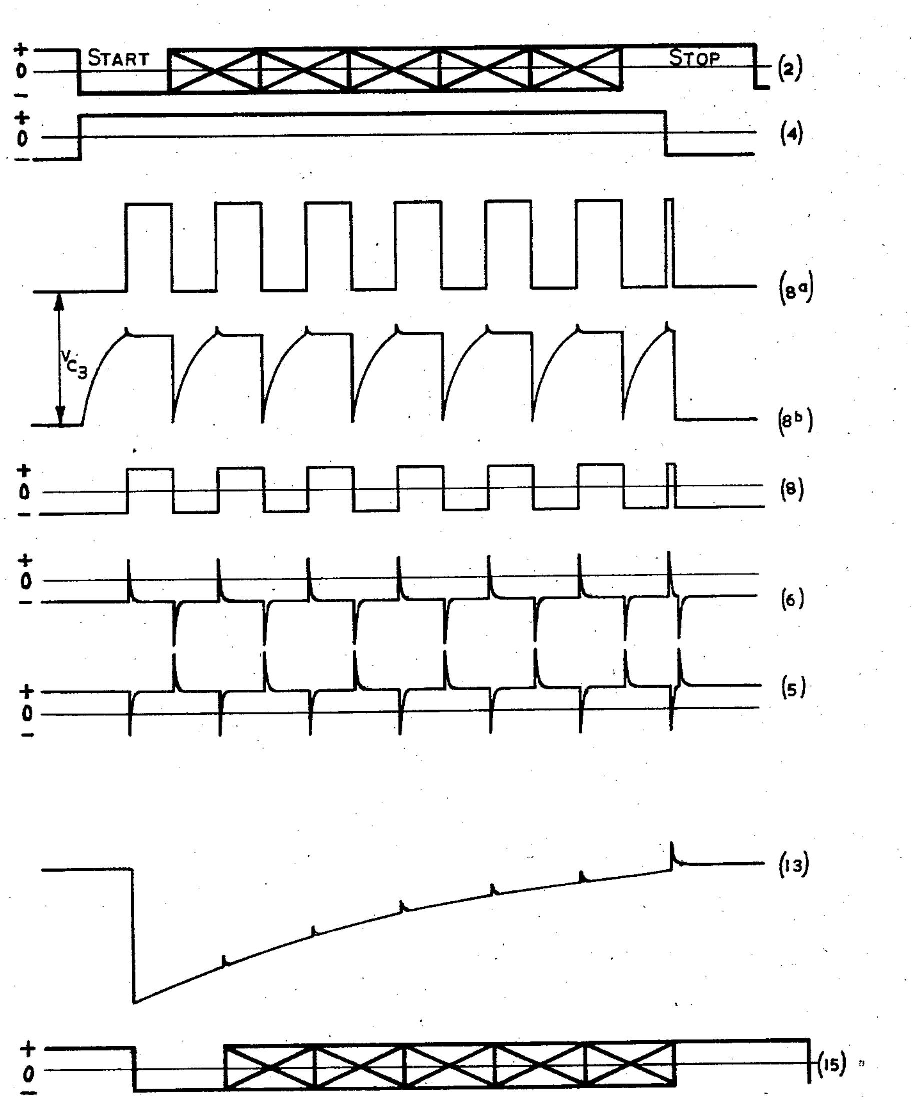
Figure 6A:
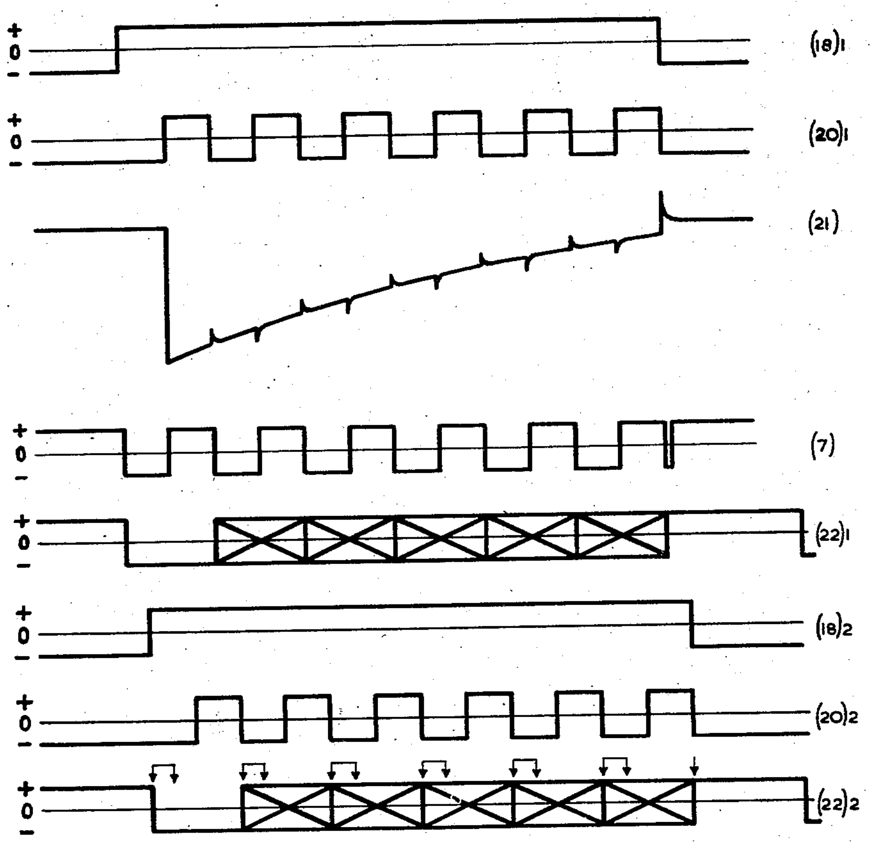
Figure 7:
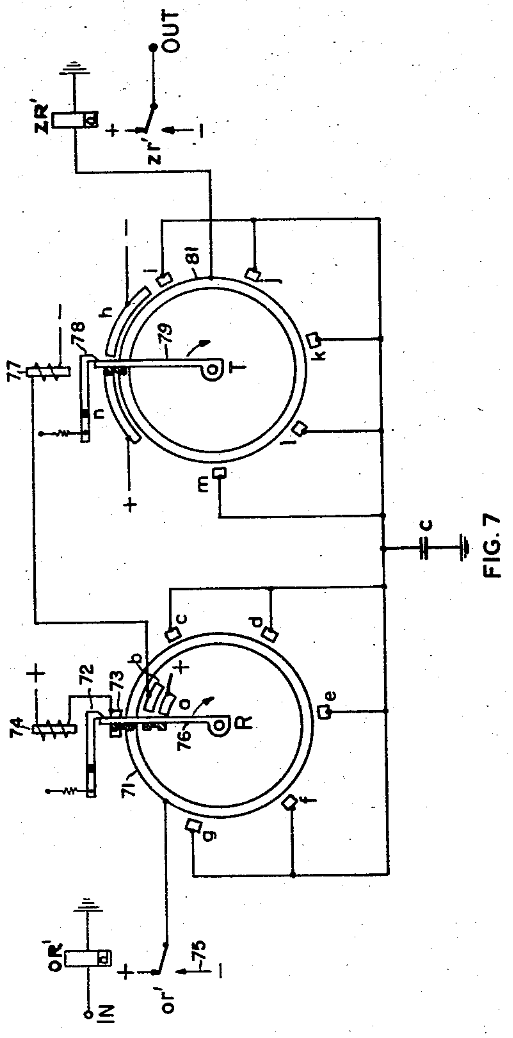

Figs. 6 and 6*a* show graphs of the voltage variation at different important time points of the circuit according to the embodiment of Fig. 5 for a complete multi-element start-stop signal wave; and Fig. 7 shows another embodiment of the invention in which the electronic regenerative repeater of Fig. 5 is replaced by a two shaft or mechanical double memory device.

I. SIGNALS THROUGH DIFFERENT TYPES OF REPEATERS IN SERIES

A. *Repeaters with a single memory device*

The previously mentioned disadvantages inherent in regenerative repeaters having one memory device may be readily explained with reference to the following example of a telegraph line which has three regenerative repeaters connected in series. It is assumed in the example that a continuous transmission of signals which have stop elements of a nominal duration, such as 30 msecs. are being used. It is also assumed that the stop-start transition of a determined signal (the first in Fig. 1) to a subsequent signal reaches the receiving end of the first regenerative repeater 40% or 8 msecs. retarded as a result of distortion, and that such distortion also occurs in the transmission line between the first and second regenerative repeater and between the second and third regenerative repeater. In other words, as a result of accidental circumstances, the stop-start transition of the one and the same signal happens to be adversely affected in the same way in all three sections of the transmission line.

Figure 1:
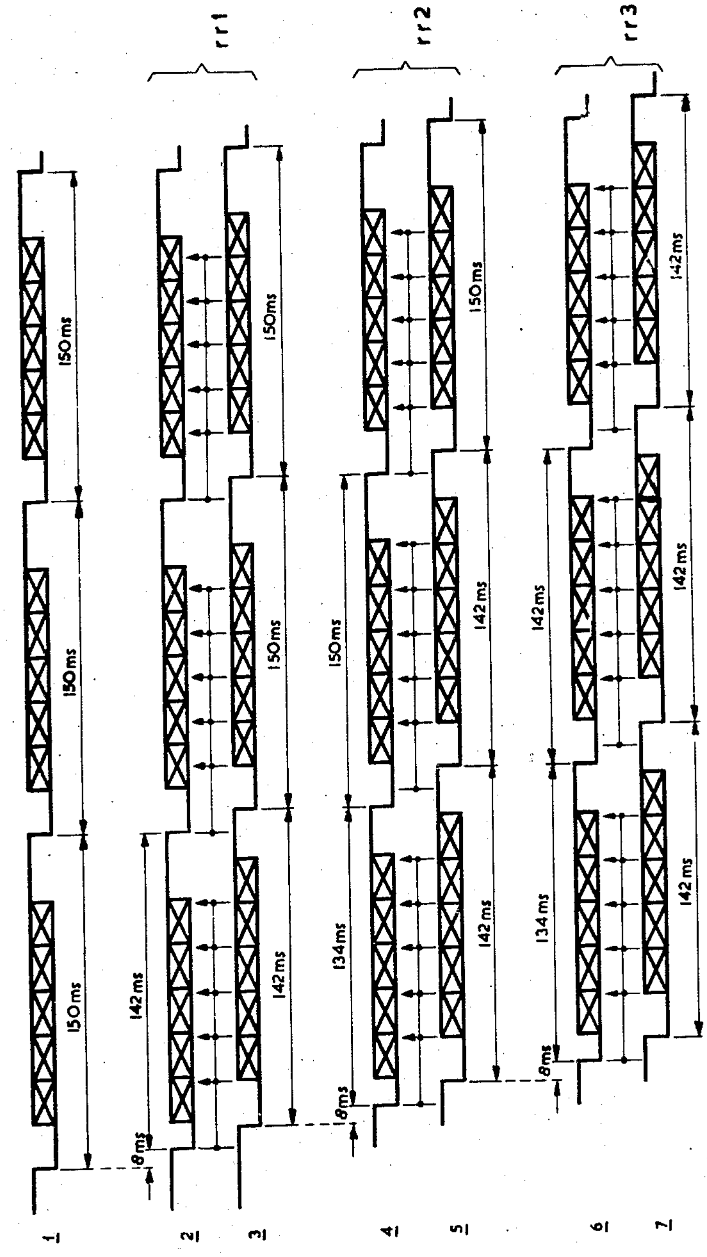
Fig. 1 shows signal wave form diagrams of the incoming and outgoing start-stop multi-element signals through three regenerative repeaters connected in a series, wherein said repeaters have only one memory device and a stop-start transition has been delayed by distortion between each of said repeaters.

In Fig. 1 shows the incoming and the outgoing signals for three successive regenerative repeaters are shown in which the transit times via the successive channels is not taken into consideration. The stop-start transition of the first signal of each series of incoming signals exhibits the said distortion of 8 msecs. (reception too late).

In Fig. 1 it is also assumed that no other distortion occurs in the signals shown and that the velocities of the incoming signals and of the regenerative repeaters are substantially correct. If such were not the case, the explanation following hereinafter would be rendered unnecessarily difficult and complicated.

Three signals from a whole series signals which are transmitted successively are shown on the first line of Fig. 1. The nominal duration of the stop element of these signals is 30 msecs., and the stop-start transition of the first of the three signals is received 8 msecs. late. The three signals are otherwise correct with regard to the duration of the intelligence elements and the stop elements.

The start element of the first signal shown is thus received having a duration of 12 msecs. The duration of the start elements of the two other signals upon their reception in the first regenerative repeater *rr*1 is 20 msecs., that is to say they are undistorted, as also shown on the second line of Fig. 1.

In Fig. 1 it is also assumed (for the sake of simplicity) that the regenerative repeaters *rr*1, *rr*2, and *rr*3 emit signals, the stop element of which has a minimum duration of 22 msecs. On the basis of these assumptions the first regenerative repeater *rr*1 retransmits the first signal shown in Fig. 1 with a stop element of 22 msecs., that is to say with a total duration of 142 msecs. Since the stop-start boundary had been shifted backwards by 8 msecs., subsequent signals can by no means be influenced in the first regenerative repeater *rr*1. As a result of the retarded reception of the stop-start transition, it will be evident that the scanning of the first signal is shifted out of the centre by 8 msecs. The scanning of subsequent signals on the second line of Fig. 1 is again quite normal at the centre of the elements, as indicated symbolically by the group of 5 vertical arrows between the wave forms on lines 2 and 3.

During the transmission of the three signals via the section between the first and second regenerative repeaters the stop-start transition of the first signal is again retarded by 8 msecs. Apart from the reduction of the stop element of the first signal in the first regenerative repeater *rr*1, the durations of all other elements of the signals on line 4 of Fig. 1 are the same as those of the elements of the signals transmitted by the first regenerative repeater *rr*1.

The second regenerative repeater *rr*2 must transmit the first signal with a stop element of a duration of 22 msecs. (forced minimum length of signal 142 msecs.).

In regenerative repeaters of the kind referred to, a difference of 10 msecs. usually exists between the incoming stop-start transition of a signal and that which is retransmitted. If the transmission time of the stop element of 22 msecs. has not reached 12 msecs. (22 minus 10), the regenerative repeater cannot start performing a new reception cycle. This situation occurs in Fig. 1 on the fifth line, during the retransmission of the stop element of the first signal shown. This implies that the cycle of the second signal starts 8 msecs. late, so that the second incoming signal, which is not distorted in itself, is also scanned by 8 msecs. overtime. A but small distortion of the boundaries of the elements of this second signal results in them being received wrongly despite the fact that the second signal has nothing to do with the large shift of the stop-start transition of the first signal.

The second signal is now also transmitted with a duration of 142 msecs. by the second regenerative repeater *rr*2 (see line 5). The third signal is not distorted as a result of the shift of the stop-start transition of preceding signals.

Even the third signal is influenced in an analogous manner by the action of a similar distortion at the stop-start transition of the same signal during the transmission through the third section.

The use of stop elements having a duration of 30 msecs. in the transmission does not therefore provide a complete safety when using regenerative repeaters in series, but it provides a greater safety than the signals having stop elements of 20 msecs., which may readily be recognized if a figure similar to Fig. 1 is drawn for this kind of signals. It is then necessary to assume that the stop stop elements of 20 msecs., which may readily be recognized if a figure similar to Fig. 1 is drawn for this kind signals then still satisfy the recommendations of the CCIT.

*B. Repeaters with separate memory devices for all the elements of one signal*

Figure 2:
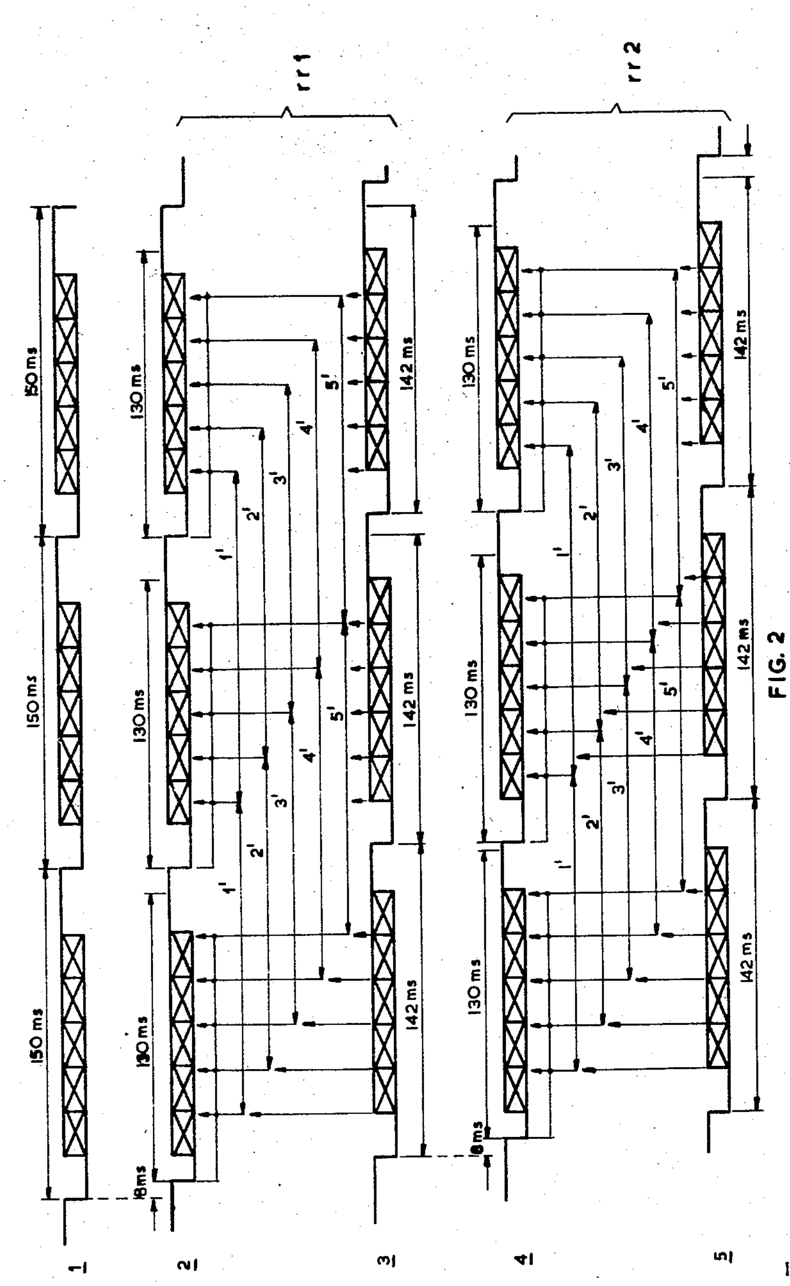
Fig. 2 is a signal wave form diagram similar to Fig. 1, in which the scanning is shown symbolically by vertical arrows and the storing by horizontal arrows, and in which the repeaters have separate memory devices for each intelligence element of a complete signal.

The above said difficulties do not occur when using a reception distributor and a transmission distributor operating substantially independently of each other such as in the aforementioned mechanical regenerative repeater comprising 2 shafts and a complete memory having a number of devices corresponding to the number of intelligence elements of the signals. Fig. 2 shows this theoretical situation in a regenerative repeater in which the transmission velocities of the input and output signals invariably have a nominal value. The reception distributor is constructed in such a manner that it can always start immediately at a stop-start transition between two signals so that the signals are always scanned in accordance with what is optimally obtainable in a start-stop system. Assuming also that a regenerator for signals having a stop element of 30 msecs. is being used and that the duration of the stop element may decrease to at the least 22 msecs. during the re-transmission by the transmitting side of the regenerator, the re-transmission may always be effected at a moment which is optimum therefor. The similarly assumed shifts of the stop-start transition of the same signal via a plurality of subsequent sections only becomes manifest in this example as an increase or reduction of the stop element which is re-transmitted. The scanning of signals which follows after the distorted signal is not affected.

Fig. 2 again shows, on the first line, a sequence of three signals of a continuous series, which are received by a regenerative repeater at the end of a transmission section and having a shift of the stop-start transition of the first signal shown, said shaft constituting a delay. The scanning is shown symbolically by means of vertical arrows. The incoming signal element is stored, for example, in capacitors or relays, until the scanning of the same signal element of the subsequent signal. This is shown symbolically by the horizontal lines marked 1′, 2′, 3′, 4,′ 5′.

This implies that a transmission distributor which operates independently of the reception distributor of the regenerative repeater, is required to have retransmitted the signal element shown within about 140 msecs. This affords a really exceptional freedom, which may be utilized to make corrections in the velocity of the retransmitted signals as a function of the velocity of the incoming signals, so that it is therefore possible to correct differences in velocity up to 2½%.

Fig. 2 shows a reception cycle of 130 msecs. at the receiving end of the regenerative repeater and a constrained minimum cycle of 142 msecs. at the transmitting end.

It is observed that this regenerative repeater also permits the utilizing of signals having a nominal duration the same as the stop element (20 msecs.). However, delays in the reception of a stop-start transition of the signals will be distributed over a larger number of signals and the safety of the transmission in regard of the reception margin is equal to that obtained with the system having a stop element of a nominal duration of 30 msecs.

Two observations may be made in connection with the mechanical regenerative repeater comprising two shafts and a complete memory which is capable of making corrections in velocity.

The CCIT allows differences in the velocity of teletypewriters in international traffic which are not greater than plus or minus ¾%, however, it is a known fact that greater differences in velocity occur. When use is made of regenerative repeaters which are capable of adapting themselves to the velocity of the transmitting teletypewriter, the velocities exceeding the above-mentioned limit may also be transmitted to another country in the form of a variation in the length of the elements of the signal instead of only a reduction or increase of the stop element of the signals. Thus the variation in velocity as used in the regenerative repeater comprising two shafts and a complete memory is of no use because of the recommendations of the CCIT, since the result does not come up to these recommendations.

*C. Repeaters with a double memory device*

If the thought of a correction of velocities of the signals by means of a variation in the length of all elements of the signals is disregarded, it may be seen from Fig. 2 that the shift of the reception scanning of the incoming signals and the scanning of the signals stored in the complete memory always succeed one another with a difference of less than 10 msecs. for signal elements with equal numbers. This implies that it must be sufficient to utilize an intermediate memory device for only one signal element, which stores this signal element during the interval between two successive scannings at the receiving side of the regenerative repeater, and a final memory device likewise for only one signal element, which at the moment of the beginning of the retransmission takes over the contents of the intermediate memory device for the duration of the transmission of the signal element. When the next signal element is received in the intermediate memory device, the preceding signal element has already been taken over in the final memory device. This will be explained more fully with reference to the diagram shown in Fig. 3. This figure, being similar to Figs. 1 and 2, shows the waveforms of three signals which form part of a continuous series of signals. The start element of the first signal shown is mutilated in the same disadvantageous way in all transmission sections, that is to say the stop-start transition always arrives 8 msecs. or 40% retarded.

Figure 3:
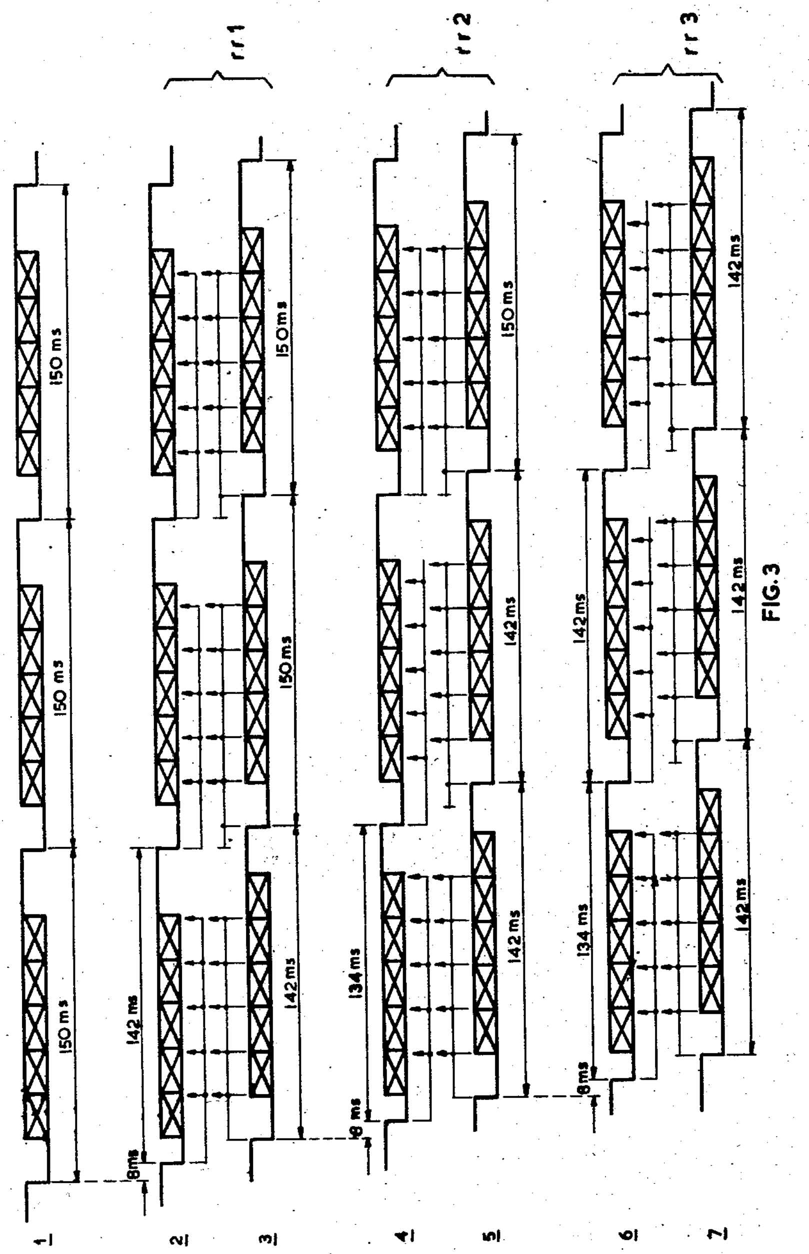
Fig. 3 is a signal wave form diagram similar to Figs. 1 and 2, showing the scanning of incoming signal elements in regenerative repeaters having double memory devices in accordance with the present invention.

Consequently, in Fig. 3, the signals are scanned at the input side of the regenerative repeater, as before, i. e. in the optimum way of the start-stop system and similar to the example of Fig. 2. The result of the scanning is stored every 20 msecs. in (systems having a transmission velocity of 50 bands) for the duration of 20 msecs. in the same memory element.

The scanning of signals at the receiving side of regenerative repeaters of this kind is indicated symbolically in Fig. 3 by the groups of 5 vertical arrows under the signals, which are indicated on the lines 2, 4 and 6, respectively, of Fig. 3. The place or time of scanning is only controlled by the stop-start-transitions of the incoming signals.

Since the stop-start transition between two signals of a continuous series of signals can be only shifted backward a maximum of 10 msecs. (because a further shift would cause the start to become false) and since it is necessary for a correct reception with otherwise undistorted element boundaries of the signal, the scanning of the corresponding memory device by means of a second memory device coupled directly with the retransmission is effected at the most only 10 msecs. later than the adjustment of the first memory device. This will be explained more fully hereinafter. It is observed in this connection that a regenerative repeater comprising such a double memory device fundamentally permits a shift of the adjustment of the second memory device of at the most 20 msecs. with respect to that of the first memory device.

The scanning of the incoming signal elements by means of the first half of the double memory device is indicated in Fig. 3 by the upper group of arrows under the incoming signals of lines 2, 4, and 6. The scanning of the first half of the double memory device by means of the second half thereof is indicated symbolically by the second group of arrows indicated under them. In the first regenerative repeater of Fig. 3, all arrows are coincident. In the second repeater *rr*2 they do not coincide in the second signal, that is to say the signal which follows after the signal with the retarded stop-start transition. In the third regenerative repeater the coincidence is already interrupted in the two signals following after the signal with the retarded stop-start transition as a result of the repetition of the unfavourable shift of the stop-start transition. The duration of said signals is reduced to 142 msecs., similar to the preceding examples. The length of the start elements and that of the intelligence elements remains the nominal 20 msecs. The resultant disadvantageous shift of the stop-start transition only becomes manifest in the retransmission as a reduction of the stop elements. This also implies that the excessively increased loss the velocity of the transmitter arranged at the beginning of the transmission lines is corrected to correspond to the nominal velocity of the elements by a reduction of the stop element equal to the difference in duration of one reception cycle. This way of correcting any excessive differences in speed has the advantage that signals are obtained which are located within the recommendations of the CCIT. The correction of excessive differences in velocity is practicable only if use is made of signals which have a nominal duration of the stop element of 30 msecs., i. e. a duration of 1½ stop elements.

A regenerative repeater comprising one double memory device may also be used for the transmission of signals in a start-stop-code having stop elements of a nominal duration of 20 msecs. However, in this case, it is necessary to have a reduction of the stop elements to at the least 18 msecs., and the resultant signals still satisfy the recommendations of the CCIT, as shown more fully in Fig. 4 the foregoing does not require further explanation after the foregoing. It may be seen from Fig. 4 that the reaction of a delayed reception of a stop-start transition extends over a larger number of signals than in a system with signals having a stop element of a nominal duration of 30 msecs.

Figure 4:
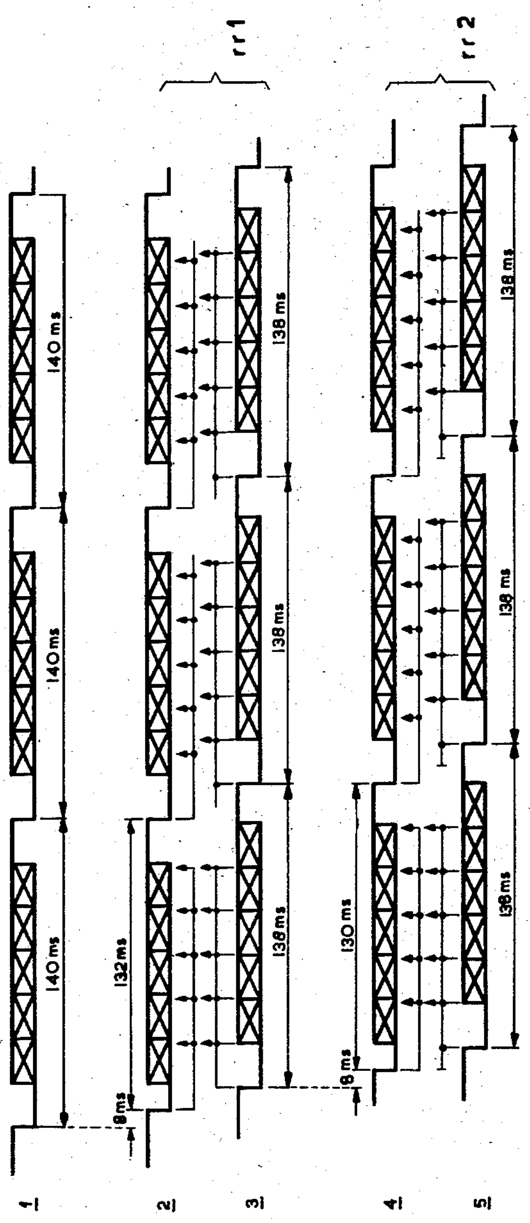
Fig. 4 is a signal wave form diagram similar to Fig. 3, showing only two repeater sections in which the normal stop elements have been reduced from 30 milliseconds to 20 milliseconds duration.

Fig. 4 shows only two sections of incoming and outgoing signals through two successive regenerative repeaters *rr* 1, *rr* 2, however it does not show a number of signals sufficient to indicate that the correction of the delay in the stop-start transition of a signal by 8 msecs. extends over four signals. A repetition of such a delay at the stop-start transition of the same signal in such subsequent regenerative repeaters section does not cause difficulty, as may be seen from lines 4 and 5 of Fig. 4 in that only the number of successive signals or their stop elements reduced is increased before complete correction.

II. ELECTRONIC REGENERATIVE REPEATER CIRCUITS

An electronic design of a regenerator comprising one double memory device according to this invention will be described hereinafter by way of example and the description will be restricted to the wiring diagram which is shown, Fig. 5.

It will be evident that such regenerative repeater, either in mechanical or in electrical form, may be manufactured with the use of different kinds of parts such as, for example, high-vacuum tubes, cold-cathode tubes, transistors, rectifying cells, polar relays, etc. It cannot be expected that all these forms of construction will be described in detail, since it will be assumed that every man skilled in one or more of these techniques can compose regenerative repeater according to this invention with variations therefrom on the basis of the description following hereinafter.

The telegraph signals to be regenerated are received, for example, by the polar receiving relay OR (Fig. 5) having an armature *or* which controls the electronic circuit. However, said polar relay may be replaced by an electronic circuit without departing from the scope of this invention. The voltage variation at point 2 of the circuit is shown on the first line of Fig. 6. This first line shows a complete telegraph signal having a stop element of a duration of 30 msecs. The signal comprises a start element, 5 intelligence elements and the stop element previously mentioned. Further description of this regenerative repeater will be directed to the reception and retransmission of signals in the usual 5-unit start-stop code. However, it is to be noted that without any fundamental modification this invention is also applicable to regenerative repeaters for signals in a start-stop code having a larger or smaller number of intelligence elements.

The signal shown in Fig. 6 has not been subjected to distortion, but it may be assumed that this incoming signal could have been subjected to any distortion permissible in a start-stop-system.

*A. First timing device*

1. FIRST START-STOP CIRCUIT

The armature of the polar relay OR is included in a circuit comprising five resistors $R_1$ through $R_5$. Via point 1 of this circuit, the regenerative repeater is started for performing one reception cycle, the incoming signal elements being scanned via point 2. The circuit including the resistors $R_1$ through $R_5$ is connected to the positive and negative terminals of a source of energy or potential, which may have a nominal value say, 220 volts. The resistors $R_1$ through $R_5$ are so proportioned that the circuit in the so-called rest position has a voltage of 60 volts on terminal 1 and a voltage of 80 volts on terminal 2. Said voltages are changed when the position of the armature *or* changes. If the voltage source is grounded at 70 volts, the armature provides voltages of plus and minus 10 volts at points 1 and 2 according to its position.

Terminal 1 is connected to a so-called start-stop circuit which comprises tubes $B_1$ and $B_2$. Said circuit controls the starting and the stopping of the first generator tubes $B_3$ and $B_4$. Said generator must produce a square-wave current having a frequency of 50 c./s. The point 1 is connected to the start-stop circuit $B_1/B_2$ through a rectifying cell $G_1$, which forms part of the relay cell comprising rectifying cells $G_1$ and $G_2$, and a resistor $R_6$, which resistor is connected to the negative terminal of the energy source. The output terminal 4 of said relay cell $G_1/G_2$ and $R_6$ always passes the most positive of the voltages appearing at the input terminals 1 and 3 to the control grid of tube $B_1$. Assuming the voltage at terminal 3 to be −10 volts when the regenerative repeater is in the rest position, that is to say that this voltage is equal to the voltage on terminal 1, the change-over of armature *or* as a result of the reception of a start element of a signal may cause the voltage at point 4 to change from −10 volts to +10 volts (see Fig. 6, second line 4), which causes the generator B3/B4 to start.

During the rest position of the regenerative repeater, the start-stop circuit ($B_1/B_2$) is maintained in a position such that the tube $B_1$ is in the non-conductive position and tube $B_2$ is in the conductive position, since the cathodes of tubes $B_1$ and $B_2$ are grounded via resistor $R_8$. Consequently, a voltage of −10 volts on the control grid of tube $B_1$ maintains this tube in the non-conductive position. Due to the coupling of the anode of tube $B_1$, which anode is connected via resistor $R_7$ to the positive terminal of the energy source, and via a potentiometer $R_9/R_{10}$ to the control grid of tube $B_2$, the tube $B_2$ is conductive during the rest position of the regenerative repeater.

2. FIRST GENERATOR CIRCUIT

The anode of tube $B_2$ is connected to the coupling point (**8*b*) of the resistor $R_{16}$ and the capacitor $C_3$ of the first generator circuit. The resistor $R_{16}$ and the capacitor $C_3$ constitute the frequency-determining element of the multivibrator $B_3/B_4$ in one direction, and the resistor $R_{20}$ and the capacitor $C_2$ constitute the frequency determining device for the movement of the multivibrator $B_3/B_4$ in the other direction. Resistors $R_{17}$, $R_{18}$ and $R_{19}$ constitute a potentiometer between the positive and the negative terminal of the energy source, which enables the frequency to be controlled to a certain extent via an adjustable contact on the resistor $R_{17}$. The cathodes of the tubes $B_3$ and $B_4$ are connected to the coupling point of the resistors $R_{18}$ and $R_{19}$. If the coupling of the anode of tube $B_2$ to the control grid of tube $B_3$ is omitted, the circuit comprising the tubes $B_3$ and $B_4$ constitutes an ordinary multivibrator, in which the conductive positions of the two tubes change (abruptly) in phase opposition at regular intervals, as may be seen at point 8***a* of the circuit (Fig. 6) for the tube $B_4$. The change in the conductive position of the tube $B_3$ is not shown in Fig. 6 for the sake of simplicity. The variations in the anode voltage may be seen at point 8*a*.

In order to clarify the operation of the circuit, the subsequent line (8*b*) of Fig. 6 shows, in addition, the variation in the voltages on the control grid of tube $B_3$ of the generator circuit (point 8*b*). If the generator has a frequency of 50 c./s., the voltages on the control grid of tube $B_4$ are temporarily shifted by 10 msecs. The potential difference between the points 8*a* and 8*b* constitutes the voltage on capacitor $C_3$.

It is very important in this kind of circuits that the generator $B_3/B_4$ during the first step after starting immediately adjusts the correct time. This may readily be ensured in this circuit by adjusting the anode voltage of tube $B_2$ of the start-stop circuit in such manner that in the conductive position (rest position of the regenerative repeater) it is exactly equal to that of capacitor $C_3$ in the lower peak, the cathode voltages of the tubes $B_3$ and $B_4$ being such that tube $B_3$ is in the non-conductive position.

The circuit of the generator is furthermore such, as to change the conductive positions of the tubes $B_3$ and $B_4$ for the first time only 10 msecs. after reception of a stop-start transition. This results in the favourable property that wrong start signals, that is to say start elements of a duration shorter than 10 msecs., cannot start the regenerative repeater for performing a reception cycle. The tube $B_2$ in this case reassumes its conductive position within 10 msecs., so that capacitor $C_3$ returns very rapidly to the potential of the rest position of the regenerative repeater. Thus generator is immediately ready for restarting, and there is no so-called blind period.

The generator $B_3/B_4$ comprises two pairs of output terminals, viz. the pair 5, 6 and the pair 7, 8. The voltage variation on terminal 8 is shown at (8) in Fig. 6. The terminals 5 and 6 are connected via the capacitors $C_1$ and $C_4$ to the anodes of the tubes $B_3$ and $B_4$. The potentiometers comprising the resistors $R_{11}$, $R_{12}$ and $R_{24}$, $R_{25}$ provide at said output terminals a constant rest potential, which is +10 volts and −10 volts, respectively. The voltage variation of the output terminals 5 and 6 is shown at (5) and (6) respectively, in Fig. 6. The point 6 has a rest potential of −10 volts and has sharp impulses having a peak value of +10 volts passing through it every 20 msecs. (at a transmission velocity of about 50 B). The point 5, however, has a rest potential of +10 volts with a sharp pulse of negative value passing through it every 20 msecs. The pulses of opposite polarities located between the two series do not influence the circuit and may therefore be disregarded.

These sharp pulses from the generator $B_3/B_4$ will be primarily used for two purposes, viz.: (*a*) for synchronizing the time-base of the regenerative repeater, by which the stopping of the generator at the end of a reception cycle must be initiated. The semi-stable trigger circuit comprising the tubes $B_5$ and $B_6$ fulfills the function of a time-base circuit. (*b*) for scanning the elements of the incoming signals. This scanning is effected with the use of the circuit comprising the rectifying cells $G_{10}$ through $G_{15}$. The result is temporarily stored in the stable trigger circuit comprising the tubes $B_{13}$ and $B_{14}$, i. e. the intermediate memory device.

3. TIME-BASE CIRCUIT

When the first generator comprising the tubes $B_3$ and $B_4$ is in the rest position of the regenerative repeater its tube $B_3$ is non-conducting and its tube $B_4$ is conducting. This results in a pulse of positive polarity being transmitted via terminal 6 upon the first change of the conductive positions of tubes $B_3$ and $B_4$ after the start. Said pulse is supplied to the rectifying cell comprising a resistor $R_{36}$ and the rectifying cells $G_3$ to $G_5$. The control grid of tube $B_6$, which is in the non-conducting position when the regenerative repeater is at rest, is controlled via rectifying cell $G_5$ by the most negative of the voltages supplied to the rectifying cells $G_3$ and $G_4$. The rest voltages connected to the cells $G_3$ and $G_4$ are −10 volts and +10 volts, respectively, so that the control voltage connected to the cell $G_3$ controls the conductive position of tube $B_6$ upon change to +10 volts. Since the first pulse originating from terminal 6 of the generator is positive (+10 volts), tube $B_6$ thus becomes conducting. Due to the coupling of the anode of tube $B_6$ via capacitor $C_6$ to the control grid of tube $B_5$, which tubes have a common cathode resistor $R_{32}$, the latter tube, tube $B_5$, will be brought into the non-conductive position. Thus the semi-stable trigger circuit comprising the tubes $B_5$ and $B_6$ is brought into the lable position for 120 msecs.

The tubes $B_5$ and $B_6$ have anode resistors $R_{31}$ and $R_{35}$, respectively. The anode of tube $B_5$ is coupled by way of a potentiometer $R_{33}$, $R_{34}$ and a resistor $R_{37}$ to the control grid of tube $B_6$, so that the change of the conductive positions of the tubes $B_5$ and $B_6$ is passed in amplified from back to the grid of tube $B_6$ as a result of the first positive pulse from the generator, so that a quick change of the conductive positions of the two tubes is enhanced.

Between the anode of tube $B_5$ and the negative terminal of the energy source there is included a potentiometer $R_{29}$, $R_{30}$, by which the voltage at point 3 of the start-stop circuit, which was −10 volts during the rest position of the regenerative repeater, is changed to +10 volts after the change-over of the semi-stable trigger $B_5/B_6$. This ensures the operation of the generator circuit during the change-over time of the semi-stable trigger $B_5/B_6$ independently of the polarity of the incoming signals. The operation of the generator is thus ensured 10 msecs. after reception of the stop-start transition of the signal to be received and regenerated.

If the stop-start transition initially ascertained would prove to be a so-called false start within 10 msecs. due to an opposite transition, the start-stop circuit comprising the tubes $B_1$ and $B_2$ returns to the rest position in which tube $B_2$ is conductive. This causes the generator comprising tubes $B_3$ and $B_4$ to stop immediately, whilst the generator is ready almost immediately for any subsequent real reception cycle due to the rapid charge of capacitor $C_3$ via the conducting tube $B_2$ so that there is no blind period.

The anode of tube $B_6$ is connected via a potentiometer $R_{38}/R_{39}$ to the negative terminal of the energy source. Said potentiometer $R_{38}/R_{39}$ is tapped via the delay member comprising the resistor $R_{40}$ and the capacitor $C_7$ which is connected to the rectifying cell $G_4$. (The object of this circuit appears when the reception cycle is terminated.)

The control grid of tube $B_5$, when the semi-stable trigger circuit assumed the lable position, became comparatively negative and subsequently slowly returned to the voltage associated with the stable position as a result of the charging process of capacitor $C_6$ via resistor $R_{27}$. The voltage variation of the control grid of tube $B_5$ (point 13) is shown at (13) in Fig. 6. Voltage pulses from the generator $B_3/B_4$ are impressed via resistor $R_{28}$ and capacitor $C_5$ upon the control grid of the tube $B_5$, so that if the charging of capacitor $C_6$ has proceeded sufficiently, the semi-stable trigger $B_5/B_6$ returns abruptly to the stable position as a result of such a synchronizing pulse. This may be seen in the line (13) of Fig. 6.

This return to the stable position takes place exactly 130 msecs. after reception of a stop-start transition + or — the accuracy of the generator comprising the tubes $B_3$ and $B_4$. The delay circuit $R_{40}$—$C_7$ is now inserted to effect, that the rectifying cell $G_4$ remains connected for some time to a point of negative voltage, so that the last positive pulse from the generator over the terminal 6 via rectifier $G_3$ cannot bring the semi-stable trigger circuit into the lable position again immediately.

B. *First scanning circuit and intermediate memory device*

During this cycle of the generator comprising the tubes $B_3$ and $B_4$ in cooperation with the semi-stable trigger circuit comprising the tubes $B_5$ and $B_6$, the incoming signal elements are scanned and temporarily stored in the intermediate memory device comprising the tubes $B_{13}$ and $B_{14}$. The elements of the incoming signals are supplied to point 11 of a first scanning circuit comprising the cells $G_{10}$ through $G_{15}$. The points 6 and 5 of the said generator circuit $B_3/B_4$ are connected to the cells $G_{10}$ and $G_{11}$, respectively. Via these cells simultaneous positive and negative sharp pulses are produced, which at rest voltages are negative and positive, respectively. The circuit comprising the cells $G_{10}$ through $G_{15}$ substantially comprises two relay cells, viz. one comprising the cells $G_{10}$, $G_{12}$, $G_{14}$ and resistor $R_{74}$ and the other relay cell comprising the cells $G_{11}$, $G_{13}$, $G_{15}$ and resistor $R_{75}$. Both relay cells give access via the rectifier cells $G_{14}$ and $G_{15}$, respectively, to point 12 of the circuit. This point is connected to the control grid of the trigger circuit comprising the tubes $B_{13}$, $B_{14}$, which is circuited as an intermediate memory device. The anode of tube $B_{13}$ is connected via resistor $R_{77}$ to the positive terminal of the energy source and connected via a potentiometer $R_{79}/R_{80}$ to the negative terminal of the said source.

The tapping point on the said potentiometer $R_{79}/R_{80}$ is connected to the control grid of tube $B_{14}$. The anode of this tube is connected via a resistor $R_{81}$ to the positive terminal of the energy source and connected via a potentiometer $R_{82}/R_{83}$ to the negative terminal thereof. The tapping point of said potentiometer $R_{82}/R_{83}$ is connected to point 23 of a second scanning circuit. The common cathode of the tubes $B_{13}$ and $B_{14}$ is connected via resistor $R_{78}$ likewise to the negative terminal of the energy source. The tapping point on potentiometer $R_{82}/R_{83}$ is back-coupled via resistor $R_{76}$ to the control grid of tube $B_{13}$, so that tube $B_{14}$ passes a voltage back to the grid of tube $B_{13}$ having a polarity such that this voltage is equal to the last voltage received via one of the rectifying cells $G_{14}$ and $G_{15}$, so that this circuit thus acquires a memory action. The cell $G_{10}$ is connected to a negative voltage via the potentiometer $R_{24}/R_{25}$, so that between the moments when a signal element is scanned influence can no longer be exerted upon the coupling point of the two said cells, $G_{10}$ and $G_{12}$ via point 12, which point is connected via resistor $R_{74}$ to the positive terminal of the energy source. In analogy therewith, cell $G_{11}$ is connected to a positive voltage via the potentiometer $R_{11}/R_{12}$, so that via cell $G_{13}$ influence can no longer be exerted upon the coupling point of the two last-mentioned cells $G_{11}$ and $G_{13}$, which is connected via resistor $R_{75}$ to the negative terminal of the energy source.

The outputs of said two relay cells are connected via the cells $G_{14}$ and $G_{15}$, respectively, to the point 12, which point may be either positive or negative according to the back-coupled voltage received via resistor $R_{76}$. If the point is positive, cell $G_{14}$ is non-conducting and cell $G_{15}$ is indifferent, and conversely.

At the moment of scanning a positive pulse and a negative pulse are received from the generator $B_3/B_4$ via the cells $G_{10}$ and $G_{11}$ respectively. If point 12, for example, is positive and the signal element to be scanned at this moment provides a positive voltage at point 11, no variation therefrom is required. However, if point 12 had a negative potential, it will have to change to a positive potential. This is accomplished as follows:

Since the cell $G_{10}$ at the moment of scanning receives a positive voltage from the generator $B_3/B_4$, the coupling point of the cells $G_{10}$ and $G_{12}$ may follow the positive voltage at point 11. Due to the fact that the circuit of relay cell $G_{11}$, $G_{13}$—$G_{15}$ is such that the coupling point can follow the most positive voltage, the coupling point of the cells $G_{11}$ and $G_{13}$, which at the moment of scanning was supplied with the negative voltage via the cell $G_{11}$, can also have a positive voltage. Since the point 12 is supplied with a positive voltage both via the cell $G_{14}$ and the cell $G_{15}$, this point 12 has a positive voltage, and the trigger circuit comprising the tubes $B_{13}$ and $B_{14}$ reverses its position.

An analogous argumentation may apply to the scanning of a signal element having a negative voltage at point 11, if the memory device occupies a position such that point 12 has a positive back-coupled voltage.

C. *Second timing device*

The seventh scanning in this example, i. e. the scanning of the last or stop element of any signal, takes place 130 msecs. after the stop-start transition. The generator comprising the tubes $B_3$ and $B_4$ then comes to rest again due to the semi-stable trigger on time-base circuit, which comprises the tubes $B_5$ and $B_6$, returning to its stable position. At the moment that the position of the semi-stable trigger circuit comprising the tubes $B_5$ and $B_6$ varies for the first time or changes from its stable to lable position, a second start-stop circuit comprising the tubes $B_7$ and $B_8$ causes the starting of a second generator circuit comprising the tubes $B_9$ and $B_{10}$. The operation time of the second generator is controlled by a second semi-stable trigger circuit comprising the tubes $B_{11}$ and $B_{12}$. Said circuits are fundamentally similar to those previously described. However, there are differences in some details. The second start-stop circuit is controlled by a relay cell comprising the cells $G_6$, $G_7$ and resistor $R_{42}$ and the series-connected relay cell comprising the cells $G_8$, $G_9$ and resistor $R_{43}$. The first relay cell follows the most negative of the control voltages supplied, the second following the most positive of the control voltages supplied.

Consequently, at the rest position of the second semi-stable trigger circuit $B_{11}/B_{12}$, tube $B_{11}$ is in the conductive position and tube $B_{12}$ is in the non-conductive position. Consequently, at the rest position of the trigger circuit, the potentiometer $R_{63/64}$ passes a negative control voltage and potentiometer $R_{70}/R_{71}$ passes a positive control voltage back to the cells $G_9$ and $G_7$, respectively.

Since $G_7$ is connected to a positive control voltage, the associated relay cell is free to follow the polarity of the control voltage connected to the cell $G_6$, if this control voltage changes from negative (at the rest position) to positive, which happens 10 msecs. after reception of a stop-start transition (see line (18)1 of Fig. 6*a*).

Since the cell $G_9$ in the rest position is connected to a negative control voltage, the positive control voltage passed via the cell $G_6$ is also passed via cell $G_8$ to the control grid of tube $B_7$. Thus this tube $B_7$ becomes conducting, and tube $B_8$ becomes non-conducting, causing the $B_9/B_{10}$ generator to start. After 10 msecs., similarly as with the generator $B_3/B_4$ first described, the first change of the conductive positions of the two generator tubes $B_9/B_{10}$ takes place (see line (20)1, Fig. 6*a*). At this moment a negative pulse is passed via capacitor $C_{14}$ and resistor $R_{96}$ to the associated semi-stable trigger circuit $B_{11}/B_{12}$, which assumes the lable position for a duration of 110 msecs. This implies that, if all circumstances are normal, this semi-stable trigger circuit $B_{11}/B_{12}$ also returns to the stable rest position 130 msecs. after reception of a stop-start transition. This return takes place under the control of synchronizing pulses provided by the generator $B_9/B_{10}$ via capacitor $C_{14}$ and resistor $R_{96}$. During the operation of the second generator circuit $B_9/B_{10}$, this circuit is rendered insensitive to external influences by the control voltage of potentiometer $R_{63}/R_{64}$ connected to the cell $G_9$. The potentiometer $R_{70}/R_{71}$ supplies a negative control voltage to the delay member comprising resistor $R_{41}$ and capacitor $C_3$, which are jointly connected to rectifying cell $G_7$. Said negative control voltage is maintained for a number of msecs. determined by said delay member, after the semi-stable trigger circuit comprising the tubes $B_{11}$ and $B_{12}$ has returned to its rest position. Since the relay cell comprising the cells $G_6$ and $G_7$ and resistor $R_{42}$ follows the most negative control voltage supplied, it is possible to maintain the second generator circuit $B_9/B_{10}$ in the stop position for some moments when the first semi-stable trigger circuit $B_5/B_6$ has already given the start signal. This is of utmost importance for satisfactory operation of the regenerative repeater of this invention.

D. *Second scanning circuit and final memory device*

The two described generators control a second scanning circuit comprising the cells $G_{16}$ through $G_{30}$. They substantially comprise two scanning circuits as previously described, but with more control voltages.

The cells $G_{17}$ through $G_{19}$ are coupled to a resistor $R_{84}$. The cells $G_{20}/G_{22}$ are coupled to the resistor $R_{85}$. The second scanning circuit, which is substantially connected in parallel with that comprising the cells $G_{16}/G_{22}$, comprises as before two more relay cells, viz. one comprising the cells $G_{23}$, $G_{25}$ and resistor $R_{86}$ and the other comprising the cells $G_{24}$, $G_{30}$ and resistor $R_{87}$.

The two pairs of scanning devices are connected in parallel via rectifying cells $G_{26}$, $G_{27}$ and $G_{28}$, $G_{29}$. They scan the signal elements temporarily stored in the intermediate memory device $B_{13}/B_{14}$ and pass them to the final memory device comprising the tubes $B_{15}$ and $B_{16}$. This second scanning device is fundamentally controlled, just disregarding the cell $G_{16}$, by two generators, viz. that comprising the tubes $B_3$ and $B_4$ and that comprising the tubes $B_9$ and $B_{10}$.

The outlets 7 and 8 of the first-mentioned generator $B_3/B_4$ are connected to the cells $G_{22}$ and $G_{17}$, the corresponding outlets 9 and 10 of the second generator $B_9/B_{10}$ being conected to the rectifying cells $G_{18}$ and $G_{21}$. The signal to be scanned is supplied to the rectifying cells $G_{19}$ and $G_{20}$. The final memory comprising the tubes $B_{15}$ and $B_{16}$ takes over the position of the intermediate memory comprising the tubes $B_{13}$ and $B_{14}$ in fundamentally the same manner as described for the scanning device comprising the rectifying cells $G_{10}$ to $G_{15}$, which is due to the scanning now being effected over a longer period. This taking over is possible only during the period in which the two generators provide a positive control voltage and a negative control voltage at the terminals 8, 9 and at the terminals 7, 10, respectively.

The circuit of the final memory comprising the tubes $B_{15}$ and $B_{16}$ is quite analogous to that of the intermediate memory comprising the tubes $B_{13}$ and $B_{14}$, except that the tapping point 15 of the potentiometer $R_{94}/R_{95}$ is grounded via a winding of a polar transmitting relay ZR. The polar transmitting relay ZR can retransmit the signal elements stored in the final memory in the form of double-current signals via the armature *zr*. If an electronic outlet for double-current signals is desired, the polar transmitting relay ZR is simply omitted. The regenerated signal is shown on line (15) in Fig. 6.

Fig. 6*a* shows on the lines (20)1 and (7) the operation of one of the tubes of the second and first generators $B_9/B_{10}$. The second generator starts 10 msecs. after the first generator $B_3/B_4$, whilst the take-over possibility exists during the rest condition and the further evenly numbered half cycles in so far they coincide with the odd numbered half cycles of the first generator $B_3/B_4$. The regenerated signal is shown on line (22)1.

If, as a result of backward displacement of the stop-start transition of a signal (late reception), the first generator $B_3/B_4$ is restarted by an immediately following stop-start transition, it may be that the second generator $B_9/B_{10}$ cannot be started due to the stop element of the regenerated signal not being ready. This prevention of starting has previously been described with reference to rectifying cell $G_7$. This results in retarded starting of the second generator $B_9/B_{10}$ and hence also in a shorter period of the possibility for the final memory comprising the tubes $B_{15}$, $B_{16}$ to take over the position of the intermediate memory comprising the tubes $B_{13}$, $B_{14}$.

This is shown in Fig. 6*a* on the line (18)2, 20(2) and (22)2. The line (18)2 indicates the second operation of the start-stop circuit comprising the tubes $B_7$ and $B_8$. The line (20)2 indicates the operation of the second generator comprising the tubes $B_9$ and $B_{10}$. The line (22)2 indicates the signal regenerated under these conditions, the duration of the taking-over being shown between arrows. In view of the very rapid adjustment of the electronic memory elements, the duration of taking-over may decrease to a fraction of a msec.

The principal operation of the regenerative repeater according to the invention has been explained herewith. However, there are some further particulars in the taking-over of the intermediate memory device $B_{13}/B_{14}$ which require a further explanation, since the possibility of taking over the contents of the intermediate memory device $B_{13}/B_{14}$ must not occur before the second start-stop circuit comprising the tubes $B_7$ and $B_8$ has been brought out of the rest position and it must not be closed before the second semi-stable trigger circuit $B_{15}/B_{16}$ has returned to its stable position. As a matter of fact, if no particular steps were taken at the beginning of the operation of the first generator $B_3/B_4$, the contents of the intermediate memory device $B_{13}/B_{14}$ would always be taken over by the final memory device $B_{15}/B_{16}$ at the beginning of the first half cycle of the first generator $B_3/B_4$ and at the rest position of the second generator $B_9/B_{10}$, that is to say a premature start of the start element of the signal to be regenerated might result and would actually result if the stop-start transition of the preceding signal were received late.

The first half of the scanning circuit for taking-over the contents of the intermediate memory device $B_{13}/B_{14}$ comprises a cell $G_{16}$, which is connected to a potentiometer $R_{46}/R_{47}$ of the second start-stop trigger circuit comprising the tubes $B_7$ and $B_8$. This circuit provides a positive control voltage during the periods of rest. The said scanning circuit is locked against premature taking-over of the starting polarity from the intermediate memory device $B_{13}/B_{14}$ due to the cell $G_{29}$ which remains cut off until the start-stop circuit releases said path by giving the control voltage on cell $G_{16}$ a negative polarity. The position of the intermediate memory device $B_{13}/B_{14}$, i. e. the negative voltage given at point 23, is then passed on via cell $G_{20}$ as a decrease of the voltage drop across resistor $R_{85}$ and subsequently due to the release of cell $G_{29}$, to the point 14.

Subsequently, the position of the intermediate memory device $B_{13}/B_{14}$ is normally taken over by the final memory device $B_{15}/B_{16}$ up to and including the adjustment of the final memory device $B_{15}/B_{16}$ at the last (in this case the fifth) intelligence element. The first generator may then be stopped before the taking-over of the stop polarity of the intermediate memory device $B_{13}/B_{14}$ by the final memory device $B_{15}/B_{16}$ is allowed. This is no longer possible via the first half of this taking-over scanning circuit. For this purpose, use is made of the second half of this taking-over circuit which can become operative only once during each operating cycle, viz. when the semi-stable trigger circuit comprising the tubes $B_{11}$ and $B_{12}$, which determines the delay of the operation between the two scanning circuits ($G_{10}$ to $G_{15}$ and $G_{16}$ to $G_{30}$), returns to its stable position. The last-mentioned semi-stable trigger circuit $B_{11}/B_{12}$ comprises two pulse outputs via the capacitors $C_{11}$ and $C_{13}$, respectively, and via these capacitors the potentiometers $R_{59}/R_{60}$ and $R_{72}/R_{73}$ are provided with positive and negative rest potentials, respectively. Consequently, the negative and positive pulses occurring only once at the end of an operating cycle become active in the described manner via the rectifying cells $G_{30}$ and $G_{25}$, respectively. The stop polarity is taken over via the cells $G_{23}$, $G_{24}$ and $G_{27}$, $G_{28}$. This stop polarity may alternatively be negative, if a closure signal is concerned.

E. *Modifications*

It is wholly within the reach of those skilled in the art to modify the circuit of Fig. 5 in such manner that the position of the intermediate memory device is taken over by the final memory device by means of pulses produced by the second generator. The second scanning circuit in this case becomes analogous to the first scanning circuit. However, it will be necessary to take steps to ensure that the scanning of the intermediate memory cannot lead with respect to that of the incoming signal. This may be achieved, for example, by providing a small, though constant delay in the start of the second generator.

III. MECHANICAL REGENERATIVE REPEATER

Fig. 7 shows the principle of a mechanical regenerative repeater comprising two time-bases or two distributors R and T which may be driven by a common shaft via a slip coupling and different gear transmissions. The reception distributor R has the division in 6½ elements required for receivers having a duration of revolution of 130 msecs., so that signals in the 7-unit-code (stop element of one unit) can be received. The transmitting distributor T may have a duration of revolution of 140 msecs., if the regenerative repeater must serve in a 7½-unit system (stop element of 1½ units) at a transmission speed of 50 B. The signal elements to be regenerated have a duration of 20 msecs. except the stop element, which has a minimum duration of 20 msecs. When used in 7-unit systems having a stop element of nominally 20 msecs., it is necessary for neutralizing any differences in speed between the incoming signal and the speed that a stop element of at the least 18 msecs. shall be regenerated to ensure that the recommendations of the CCIT are still satisfied. The transmitting distributor T in this case requires a duration of revolution of 138 msecs. It will be assumed hereinafter in the description that the transmitting distributor T is divided into 7 equal elements.

The winding of a polar receiving relay OR' is connected to the receiving line in Fig. 7. The armature *or'* of this relay in the rest position is connected to the plus terminal of the battery and is also connected to a slip ring or a so-called common contact 71 of the reception distributor R. The distributor shaft is maintained in the output position shown by means of a pawl 72. In this position contact is established with a lamination 73 which is connected to the winding of the decoupling magnet 74. The other side of the decoupling magnet of the reception distributor is connected to the positive terminal of the battery. At the rest position of the polar receiving relay OR', this circuit cannot be traversed by current. However, when a start element of a signal is received, the armature *or'* engages the contact 75 which is connected to the negative terminal of the battery. A current thus flows through the said coupling magnet 74, attracting its armature and lifting the pawl 72 in the example under consideration, so that the reception distributor R is set into movement by the driving shaft via the slip coupling (not shown) for performing one revolution. During this revolution, the intelligence elements of the incoming signal are scanned in the ordinary and known way by means of contacts *c, d, e, f,* and *g* having a short closing period with respect to the duration of an element. The kind of current of the elements, plus or minus, is subsequently stored in an intermediate memory device which is common to all elements. The intermediate memory device is shown here as a capacitor C. It will be evident that it may alternatively be a polar relay with sufficiently quick reaction, which remains in the position once occupied by means of a flip-flop action or by other means until an opposite command is given.

Due to closure of the two contacts *a* and *b* by the distributor arm 76, the reception distributor R, immediately after the start, energizes the decoupling magnet 77 of the transmission distributor T, which lifts the associated pawl lever 78, so that the distributor T is released for performing one revolution. The first contact or segment *h* of the distributor T is connected to the polarity of the start element (minus), the five subsequent contacts or segments *i, j, k, l* and *m,* which need make contact only for the duration sufficient for scanning the intermediate memory device *c*, are connected to the said intermediate memory device. If it is a capacitor, the connection may take place as shown in Fig. 7. If the intermediate memory device is a polar relay, said contacts must be connected to the armature 79, the two contacts being connected to the positive and the negative terminal, respectively, of the battery. The contact *n* of the transmission distributor T which serves for producing the stop element, is rigidly connected to the positive terminal of the battery in Fig. 7. It is observed that such is inadmissible when using the regenerative repeater in telegraph lines which co-operate with systems having calling and closure signalling. In such a case the stop element must be scanned by the reception distributor and retransmitted by the transmission distributor. If a permanent start polarity is received, the regenerative repeater does not come to rest.

In performing a revolution, the transmission distributor T thus first transmits a start element (−), since the general contact 81 of the transmission distributor T is connected to a winding of a polar device transmission relay ZR, which may serve as a final memory device and in this example is preferably adjusted in a flip-flop manner. The other end of said winding is grounded, i. e. to the centre of the battery. Subsequently, five times the contents of the intermediate memory device is taken over successively by the transmission relay or final memory device ZR. This transmission relay always remains in the position taken over during 20 msecs. i. e. the length of an element, so that a non-distorted signal is regenerated. If, now, due to the above-described distortion of the stop-start transition of a signal, the reception distributor R must start too early at the reception of the subsequent signal (max. 10 msecs. if the scanning is timeless) (in practice ±8 msecs.), the transmission distributor T has not returned to its initial position such as when said signal is given immediately after that having the distorted stop-start transition. The transmission distributor T must in this case continue its rotation without stopping. The reception distributor R must maintain the pawl lever 78 lifted from the transmission distributor T during a period up to maximum 10 msecs. after the start. The difference in position between the two distributors then disappears again after one or more signals, as may follow in accordance with the wave forms above described in Fig. 4.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a telecommunication system for multi-element start-stop type code signals, a method of regeneratively repeating said signals comprising: separately and successively receiving said signals, successively scanning each element of each signal received, successively storing each element received and scanned, then successively scanning and removing each stored element for further storage before the next successive received and scanned element is stored, and successively retransmitting each restored element whereby time distortions between successive signals may be automatically corrected.

2. A regenerative repeater for signals in a multi-element stop-start type code, comprising: means for receiving said signals, means for generating a predetermined number of pulses for scanning the elements of one signal, a first means for successively scanning each element of each received signal, a first means for successively storing each element so received and so scanned, a second means for generating a second predetermined series of scanning pulses for scanning said stored elements, a second means for successively scanning each of said stored elements by said second generated pulses, a second storing means for further successively re-storing each of said elements removed from said first storing means by said second regenerated pulses, and means for successively retransmitting each re-stored element, whereby time distortions between successive signals may be automatically corrected.

3. A regenerative repeater for signals in a start-stop code comprising: a receiving circuit, a first time base circuit, a second time base circuit which operates substantially independently of said first time base circuit, an intermediate storing means for one signal element, a first and second scanning means controlled respectively by said first and second time base circuits, and a final storing means for one signal element, whereby said first scanning means successively stores the elements of each signal in said intermediate storing means and then said second scanning means successively transfers each element from said intermediate storing means to said final storing means before the next received element is scanned by said first scanning means.

4. An electronic regenerative repeater according to claim 3 wherein said scanning devices comprise static electronic relay cell means including rectifiers.

5. A mechanical regenerative repeater according to claim 3 wherein said scanning devices comprise rotating distributors.

6. A regenerative repeater according to claim 3 wherein said time base circuit is controlled by the stop-start transition of each signal.

7. A regenerative repeater according to claim 3 including means for maintaining the position of said intermediate storing means unvaried for the duration of at least one signal element.

8. A regenerative repeater according to claim 3 including means controlled by said final storing means to produce the regenerated signal elements.

9. A regenerative repeater according to claim 3 wherein said receiving circuit comprises a polar receiving relay.

10. A regenerative repeater for multi-element stop-start type code signals, comprising: a receiving means, a first time base means, a second time base means, a first scanning means controlled by said first time base means for scanning each element of each signal as it is received in said receiving means, a first and the same memory device controlled by first scanning means for successively storing each scanned element, a second scanning means controlled by said second time base means for successively scanning each stored element, a second and the same memory device controlled by said second scanning means for successively restoring each stored and secondly scanned element, and a transmitting means controlled by said second memory device.

11. A regenerative repeater according to claim 10 wherein said scanning means comprise rectifier cells.

12. A regenerative repeater according to claim 10 wherein said memory devices comprise bi-stable trigger circuits.

13. A regenerative repeater according to claim 10 wherein at least one of said memory devices comprises a relay.

14. A regenerative repeater according to claim 10 wherein said first memory device comprises a capacitor.

15. A regenerative repeater according to claim 10 wherein said scanning means comprise mechanical distributors.

16. A regenerative repeater according to claim 15 including an electric motor for driving both of said mechanical distributors.

17. A regenerative repeater according to claim 16 including separate electro-magnetic means controlled by their corresponding time base means for separately controlling the driving of each of said mechanical distributors by said electric motor.

18. A regenerative repeater according to claim 10 wherein said transmitting means comprises a polar relay.

19. A regenerative repeater according to claim 10 wherein each of said time base means comprises a start-stop circuit, an oscillator generator circuit, and a semi-stable trigger circuit.

20. A regenerative repeater according to claim 10 wherein said first time base means is controlled by the start-stop transition of each following signal.

21. A regenerative repeater according to claim 10 wherein said second time base means includes means for generating a stop element for the signal regenerated by said repeater when said second time base means completes its cycle and returns to its rest position.

22. A regenerative repeater for signals in a start-stop code in which said signals comprise a start element, a plurality of intelligence elements, and a stop element, said regenerative repeater comprising: a first starting and stopping means, a first pulse generating means controlled by said first starting and stopping means, a first timing means to control the operation of said first generating means, a first scanning means comprising rectifying cells, an intermediate storing means controlled by said first scanning means, a second starting and stopping means, a second scanning means controlled by said second starting and stopping means, a second timing means to control the operation of said second generating means, a second scanning means comprising rectifying cells, and a final storing means controlled by said second scanning means, whereby said second scanning means transfers the elements stored in said first scanning means to said second scanning means before the next element of the signal received is scanned by first scanning means.

23. A regenerative repeater according to claim 22 including means for starting said second starting and stopping means by the operation of said first timing means.

24. A regenerative repeater according to claim 22 wherein said first and second timing means for controlling said generating means each comprises a semi-stable trigger circuit.

25. A regenerative repeater according to claim 22 wherein said intermediate and final storing means each comprises a bi-stable trigger circuit.

26. A regenerative repeater according to claim 22 including means for maintaining said second generating means in its stop or rest position a short time before being started under the control of said first timing means.

27. A mechanical regenerative repeater comprising: a receiving circuit, a mechanical reception distributing means having scanning contacts, one and the same intermediate storing means for storing each element of each signal multiply connected to said scanning contacts, a mechanical transmission distributing means having scanning contacts multiply connected to said intermediate storing means, and a final storing means controlled by said mechanical transmission distributing means.

28. A regenerative repeater according to claim 27 wherein said receiving circuit comprises a polar receiving relay.

29. A regenerative repeater according to claim 27 wherein said intermediate storing means comprises a capacitor.

30. A regenerative repeater according to claim 27 wherein said final storing means comprises a polar transmitting relay.

31. A regenerative repeater according to claim 27 wherein said mechanical reception and transmission distributing means operate substantially independently of each other.

32. A regenerative repeater according to claim 27 including an electric motor and means for separately electromagnetically coupling said mechanical reception and transmitting distributing means to said electric motor.

33. A regenerative repeater circuit for stop-start multi-element code signals, comprising: a signal receiving circuit comprising: a first start-stop circuit, a first oscillator generator started by said first start-stop circuit, a first time base circuit started by said first generator for stopping said generator a predetermined time after its start but sufficient for the reception of one complete multi-element signal, a first scanning device controlled by said first generator for scanning each element of each signal as it is received, and an intermediate first memory device controlled by said first scanning device to store successively each element of each signal as it is received; a second start-stop circuit started by the start of said first time base circuit, a second oscillator generator started by said second start-stop circuit, a second time base circuit started by said second generator for stopping said second generator, a second storing device for regenerating each element of each signal to be repeated, and a second scanning device controlled by at least one of said generators for scanning each element of each signal after it has been stored in said first memory device and transferring it to said second memory device for transmission.

34. A regenerative repeater according to claim 33 wherein said first generator includes means to prevent false starts of said receiving circuit.

35. A regenerative repeater according to claim 33 including means controlled by said time base circuits to compensate for delay by distortion of the start of a signal.

36. A regenerative repeater according to claim 35 wherein said means to compensate for said delay comprises means controlled by said second time base circuit for varying the duration of the final stop element of each regenerated signal.

37. A telecommunication system comprising a plurality of regenerative repeater circuits according to claim 8 connected together in series.

References Cited in the file of this patent

UNITED STATES PATENTS

| | | |
|---|---|---|
| 2,039,629 | Burton | May 5, 1936 |
| 2,121,163 | Robinson | June 21, 1938 |
| 2,354,534 | Mason | July 23, 1944 |
| 2,465,507 | Bacon | Mar. 29, 1949 |
| 2,522,739 | Bayard et al. | Sept. 19, 1950 |
| 2,606,961 | Roberts | Aug. 12, 1952 |
| 2,685,613 | Liguori | Aug. 3, 1954 |